United States Patent
Allain et al.

(10) Patent No.: US 8,109,258 B2
(45) Date of Patent: Feb. 7, 2012

(54) METHOD OF DIAGNOSING A SLOW EGR SYSTEM IN AN INTERNAL COMBUSTION ENGINE

(75) Inventors: Marc Christian Allain, Plymouth, MI (US); Miguel Menoyo-Alonso, Royal Oak, MI (US)

(73) Assignee: Detroit Diesel Corporation, Detroit, MI (US)

( * ) Notice: Subject to any disclaimer, the term of this patent is extended or adjusted under 35 U.S.C. 154(b) by 347 days.

(21) Appl. No.: 12/533,555

(22) Filed: Jul. 31, 2009

(65) Prior Publication Data

US 2011/0023845 A1    Feb. 3, 2011

(51) Int. Cl.
*F02B 47/08*    (2006.01)
*F02B 47/10*    (2006.01)

(52) U.S. Cl. .................................. 123/568.16
(58) Field of Classification Search ............. 123/568.16, 123/568.11, 198 D; 701/108; 73/114.74
See application file for complete search history.

(56) References Cited

U.S. PATENT DOCUMENTS

| | | | |
|---|---|---|---|
| 6,301,888 B1 | 10/2001 | Gray, Jr. | |
| 6,401,700 B2 | 6/2002 | Balekai et al. | |
| 6,470,682 B2 | 10/2002 | Gray, Jr. | |
| 6,837,226 B2 * | 1/2005 | Wang et al. | 123/568.16 |
| 7,124,751 B2 * | 10/2006 | Hardman et al. | 123/568.21 |
| 7,243,019 B2 * | 7/2007 | McLain et al. | 701/108 |
| 7,281,518 B1 | 10/2007 | Allain et al. | |
| 7,321,820 B2 * | 1/2008 | Yanakiev et al. | 701/105 |

* cited by examiner

*Primary Examiner* — Mahmoud Gimie
(74) *Attorney, Agent, or Firm* — Bill C. Paganos; Rader, Fishman & Grauer PLLC

(57) ABSTRACT

There is disclosed a method for diagnosing slow EGR response in an internal combustion engine equipped with an electronic controller with memory. In one embodiment, the method includes passing an EGR setpoint value and an actual EGR value through first order filters to eliminate high frequency noise; determining an actual EGR gradient as a function of any difference between the EGR set point and the actual EGR value while simultaneously determining an actual EGR gradient; and logging a fault in the electronic controller if the expected EGR gradient is greater than the actual EGR gradient by a predetermined amount.

7 Claims, 2 Drawing Sheets

METHOD OF DIAGNOSING A SLOW EGR SYSTEM IN AN INTERNAL COMBUSTION ENGINE

TECHNICAL FIELD

Modern on highway engines, especially heavy duty diesel engines. Require monitoring of the EGR system response time. Emission standards, especially for the heavy duty diesel engines require that engine operation confirm at all times to emission standards.

There is a need to provide a method to monitor and diagnose slow EGR system response in a heavy duty diesel engine to alert the owner or operator to any incipient problems so that they may be serviced at the earliest convenience.

SUMMARY

In one embodiment, the present disclosure relates to a method for diagnosing slow EGR response in an internal combustion engine equipped with an electronic controller with memory. The method includes:
  determining an actual EGR gradient;
  determining an expected EGR gradient
  comparing the expected EGR gradient to the actual EGR gradient
  determining the expected EGR gradient is greater that the actual EGR gradient and activating an alert and logging a fault in the electronic controller if the expected EGR gradient is greater than the actual EGR gradient.

The engine continues normal operation if the expected EGR gradient is not greater than the actual EGR gradient. The expected EGR gradient is a difference based estimation of an EGR signal derivative. The expected EGR gradient is a function of the difference between the EGR set point and the actual EGR The slow EGR response may be summarized as an amount of time it takes for the EGR to respond to at least a sudden change in EGR set point or a sudden change in change in engine operating condition, or both. Any changes in engine operation can be used, including changes in engine speed, engine torque, and engine load. The method is a closed loop and is continuous during operation of the engine.

DETAILED DESCRIPTION OF THE PREFERRED EMBODIMENT(S)

Figure 1:
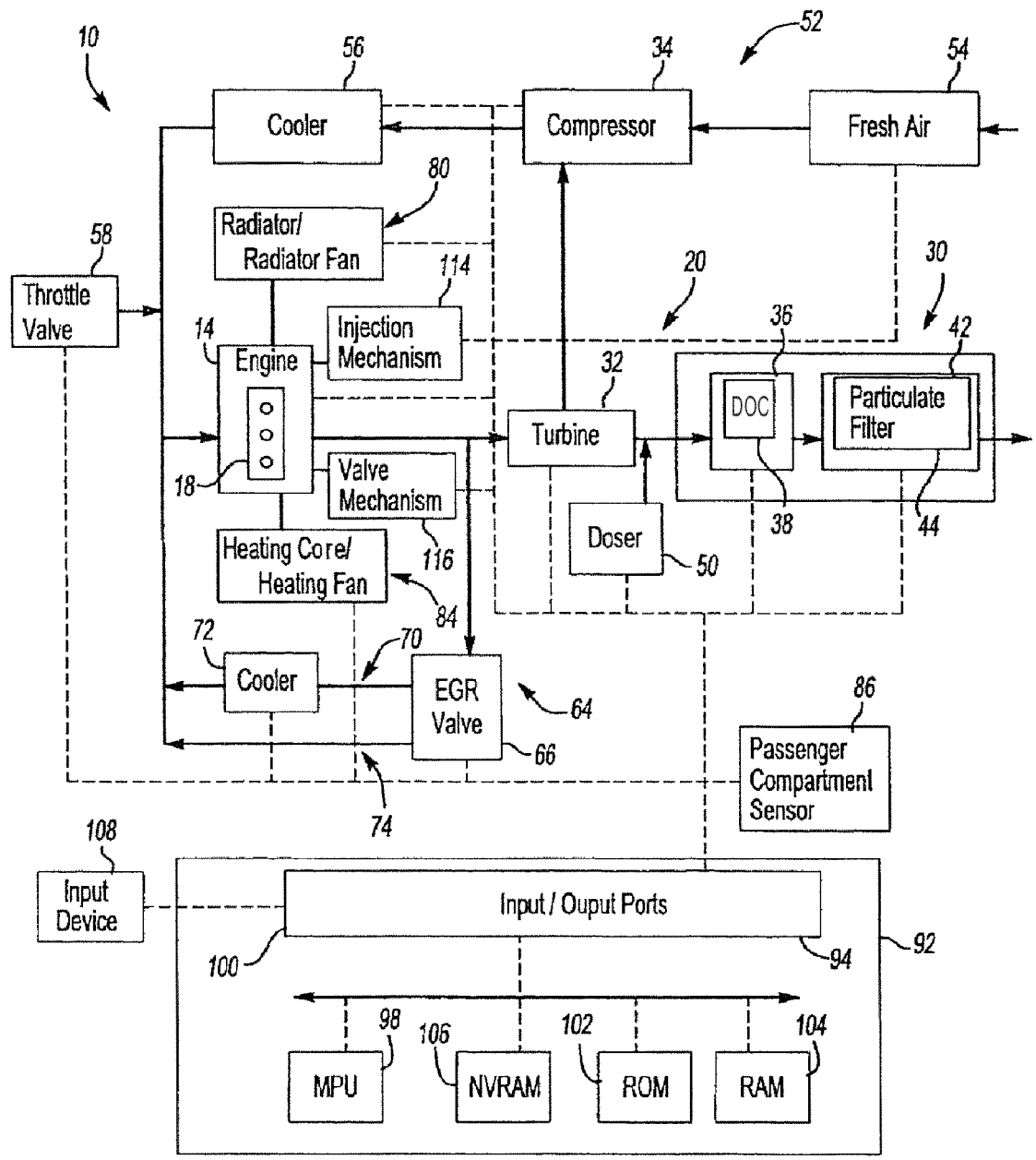
FIG. 1 is a schematic representation of an internal combustion engine with at EGR and an electronic controller.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with a compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbo compound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions there between to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. The throttle valve 58 may be an electrically operated valve. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming fuel charge and lower peak combustion temperatures to reduce the amount of oxides of nitrogen produced during combustion. The amount of exhaust gas to be re-circulated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an air cooler 72, and an EGR non-cooler bypass 74. The EGR value 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant there through. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 invention may operate in conjunction with a heating system 84. The heating system 84 may include a heating cone, a heating fan, and a heater valve. The heating cone may receive heated coolant fluid from the engine 14 through the heater valve so that the heating fan, which may be electrically controllable by occupants in a passenger area or cab of a vehicle, may blow air warmed by the heating cone to the passengers. For example, the heating fan may be controllable at various speeds to control an amount of warmed air blown past the heating cone whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information there between. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to any of the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or sub-systems, including an exhaust system controller to control exhaust gas temperatures, mass flow rates, and other features associated therewith. In addition, these controllers may include other controllers besides the DDEC controller described above.

Figure 2:
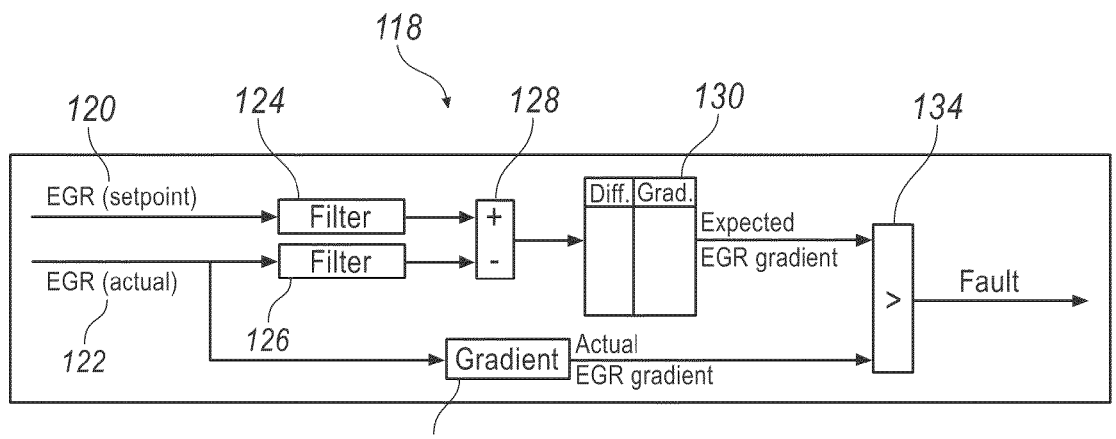
FIG. 2 is a schematic representation of an algorithm according to one embodiment of the present disclosure.

FIG. 2 is a representation of an algorithm 118 illustrative of one method according to the present disclosure. Specifically, EGR set point value 120 and EGR actual 122 are passed through first order filters 124 and 126, respectively, to eliminate high frequency signal noise effects on the robustness of the algorithm. The algorithm compares the expected EGR gradient to the measured EGR gradient. In this regard, the gradient is understood to be a difference, as seen at 128, based estimation of the signal derivative $$EGR(t)-EGR(t-1)/\Delta t$$

Wherein;

t is time.

As can be understood be reference to FIG. 2, the expected EGR gradient is tabulated as a function of the difference between the EGR set point and the actual EGR value, as seen at 130. Simultaneously, the actual EGR is determined as a gradient at 132, and the actual EGR gradient is compared to the expected EGR gradient at 134. If the expected EGR gradient is greater by a predetermined amount than the actual EGR gradient, a fault is logged in the controller and a warning signal may optionally be activated to alert an operator of the event.

Figure 3:
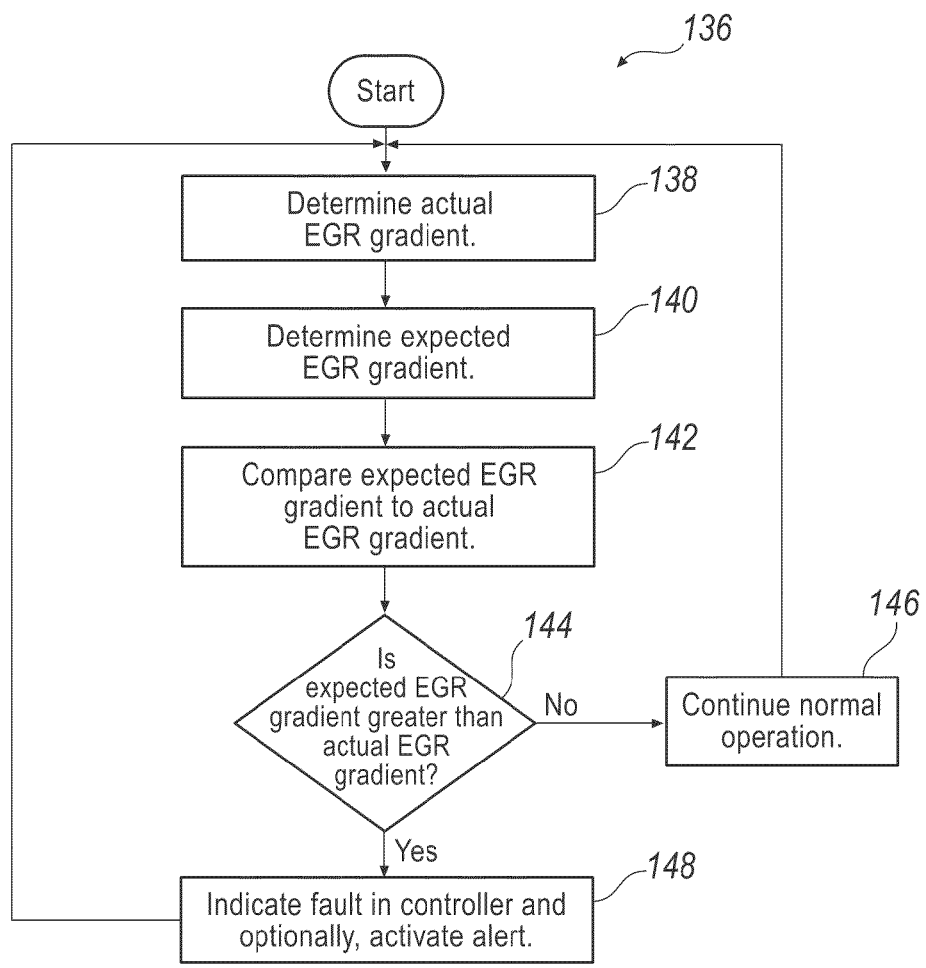
FIG. 3 is a software flow chart showing one method to diagnose a slow EGR system according to the present disclosure.

FIG. 3 is a software diagram showing one method 136 according to one embodiment of the present disclosure. Specifically, the method is a closed loop, and is continuous during operation of the engine. Step 138 is determining the actual EGR gradient. Step 140 is detaining the expected EGR gradient. It may be that both steps 138 and 140 occur in parallel, or they may occur serially. Step 144 is determining whether the expected EGR gradient is greater than the actual EGR gradient by a predetermined amount, preferably by using the algorithm as described in relation to FIG. 2 above. If the determination is that the expected EGR gradient is not greater than the actual EGR gradient by a predetermined amount, the software loops back to the beginning. If the determination is that it does, then step 148 is indicate a fault in memory of the controller, and, optionally, activate a warning to alert the operator to warn of the logged event. The words used in the specification are understood to be words of description and not words of limitation. Those skilled in the art recognize that many variations and modifications are possible without departing from the scope and spirit of the invention as set forth in the appended claims.

We claim:

1. A method for diagnosing slow EGR response in an internal combustion engine equipped with an electronic controller with memory, comprising:

passing an EGR setpoint value and an actual EGR value through first order filters to eliminate high frequency noise;

determining an expected EGR gradient as a function of any difference between the EGR set point and the actual EGR value while simultaneously determining an actual EGR gradient;

comparing the expected EGR gradient to the actual EGR gradient; and logging a fault in the electronic controller if the expected EGR gradient is greater than the actual EGR gradient by a predetermined amount.

2. The method of claim 1, wherein the engine continues normal operation if the expected EGR gradient is not greater than the actual EGR gradient.

3. The method of claim 1, wherein the slow EGR response is summarized as an amount of time required for the EGR to respond to at least one of a sudden change in EGR set point or a sudden change in engine operating condition.

4. The method of claim 3, wherein the change in engine operating condition includes changes in engine speed, engine torque, and engine load.

5. The method of claim 1, wherein the expected EGR gradient is a difference based estimation of an EGR signal derivative.

6. The method of claim 1, wherein said method is a continuous closed feedback loop.

7. The method of claim 1, further including activating a warning signal to alert an operator of the EGR condition.

* * * * *